United States Patent [19]

Brouwer

[11] 4,203,845
[45] May 20, 1980

[54] FILTER PRESS

[76] Inventor: Egbert K. Brouwer, Thorbeckestraat 107, Veendam, Netherlands

[21] Appl. No.: 1,603

[22] Filed: Jan. 8, 1979

[30] Foreign Application Priority Data

Jan. 13, 1978 [NL] Netherlands .......................... 7800473

[51] Int. Cl.$^2$ ...................... B01D 33/14; B01D 35/26
[52] U.S. Cl. .................................. 210/386; 210/400; 210/416 R
[58] Field of Search .................. 162/317, 214; 34/115, 34/116, 120, 123; 100/90, 118, 119, 151–154; 210/350, 351, 386, 400, 401, 402, 416 R, 406

[56] References Cited

U.S. PATENT DOCUMENTS

| | | | |
|---|---|---|---|
| 2,859,537 | 11/1958 | Schockey | 34/120 |
| 3,397,792 | 8/1968 | Serrell | 210/401 |

FOREIGN PATENT DOCUMENTS 343529  5/1904  France ........................................ 34/120

Primary Examiner—Frank Sever
Attorney, Agent, or Firm—Irvin A. Lavine

[57] ABSTRACT

A press filter for at least partially separating a mixture comprising a liquid phase and a solid phase into a product substantially containing the solid phase and a product substantially containing the liquid phase. The apparatus comprises a plurality of parallel, cylindrical hollow filter rollers with a perforated cylindrical surface, and an endless imperforate pressure belt passed around a circumferential portion of the cylindrical surface of each of the filter rollers. The filter rollers are grouped in two side-by-side rows of rollers located one below the other, the rollers in the two rows having an opposite direction of rotation, and both sides of the pressure belt are used for the exercise of pressure on the cylindrical surface.

9 Claims, 4 Drawing Figures

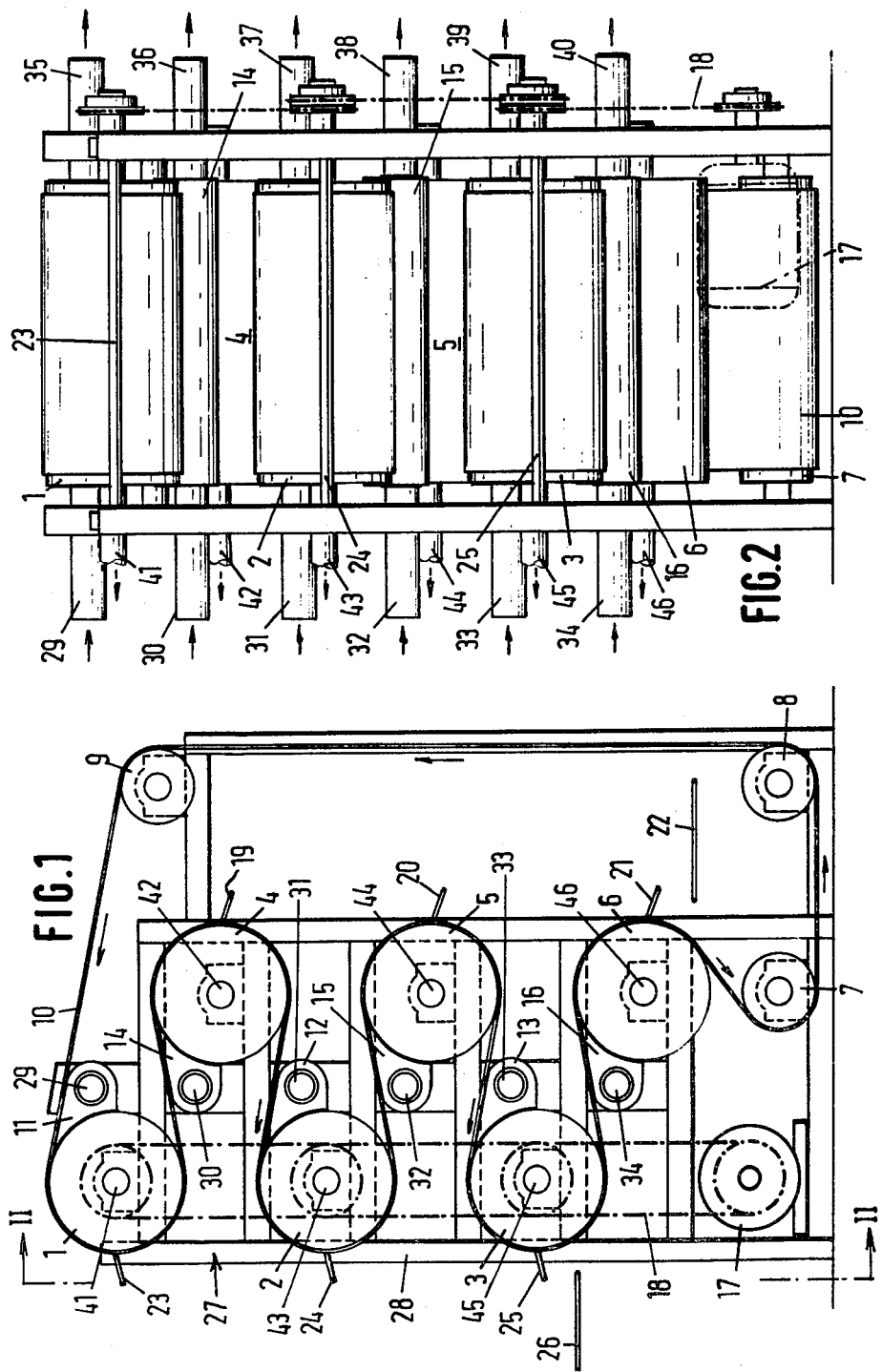

FILTER PRESS

This invention relates to a filter press for at least partially separating under pressure a mixture containing a liquid phase and a solid phase into a product substantially containing the solid phase and a product substantially containing the liquid phase.

Filter presses are well-known. One example is described in British Patent Specification No. 1,457,000, and comprising a plurality of parallel cylindrical hollow filter rollers having a perforated cylindrical surface, a plurality of return rollers and/or tensioning rollers, and an endless imperforate pressure belt trained about a peripheral portion of the cylindrical surface of each of the filter rollers and about the return and tensioning rollers for separation of the mixture to take place in the area of contact of the pressure belt and the peripheral portion of the cylindrical surface of the filter rollers under an adjustable pressure from the pressure belt on the cylindrical surface, distributing means for supplying the mixture to be separated at a controllable pressure to the nip between the pressure belt and the filter rollers, means for advancing the endless pressure belt with simultaneous rotation of the filter rollers and return rollers, means for supplying the mixture to be separated to said distributing means, and means for discharging the separated liquid phase and the solid phase.

Apparatus of this kind can be used for separating the liquid phase and the solid phase in a mixture thereof, for example, potato pulp, sugar-beet pulp, manioc-root pulp. The prior apparatus comprises a plurality of return rollers in addition to a plurality of pairs of return rollers and hollow cylindrical filter rollers, which rollers have a smooth perforate cylindrical surface.

The filter rollers are disposed in a horizontal position and parallel to each other. An endless smooth imperforate pressure belt, made for example of a plastics material, is trained with a certain tension about a portion of the cylindrical surface of each of the filter rollers and the return rollers. Each of the filter rollers is separately driven to carry along the endless pressure belt.

The mixture to be separated is supplied to the nip between the pressure belt and the filter roller, and transported further between the belt and the roller with the exercise of pressure thereon, as a result of which the liquid phase is squeezed out.

The squeezed-out liquid phase passes through the perforations in the cylindrical surface into the hollow roller, and after reaching a given quantity by volume, flows through the open ends to the outside for it to be collected in a funnel located under the filter press.

In the prior filter press referred to, the same side only of the imperforate pressure belt is passed around the filter rollers and hence used as the pressure exerting side, while all filter rollers have the same direction of rotation.

In view of the pressure exercised on the mixture to be separated in the area of contact between the pressure belt and the cylindrical surface of the filter roller, the mixture to be separated must be supplied under pressure to the nip between the belt and the roller. For this purpose the prior apparatus comprises a pump, a substantially horizontal header connected to the pump, which header is in turn connected to one end of a plurality of substantially vertical branch conduits corresponding to the plurality of filter rollers, the other ends of which branch conduits terminating in the vicinity of the nip between the belt and the roller, and being effectively adapted in shape so as to effect, together with other sealing means, a supply of the mixture under the influence of the pump pressure and the weight of the material in the vertical branch conduits to the nip practically without loss of material. Via a flexible diaphragm in the header, and depending on the nature of the mixture to be separated, the opening to each of the vertical branch conduits can be successively closed from that located farthest from the pump onwards.

It is of importance that the solid phase remaining behind in the area of contact between the pressure belt and the filter roller is kept under pressure for a sufficiently long period of time when the cylinder surface is removed from it, to prevent that liquid removed is "sucked" back into the expressed material, which would result in a decrease of the separating efficiency. In the prior apparatus, the means for removing the separated solid phase from the surface of the filter roller consists of scraper blades adjustable substantially tangentially to the roller surface and parallel to the pressure belt, and substantially in contact with the surface of the filter roller. Maintaining the separated solid material under pressure for a sufficiently long period of time during its removal from the filter roller is achieved by maintaining as long a passage as possible between the scraper blade and the pressure belt before removing the solid material from the belt. According to a different embodiment, a pressure roller may be used for maintaining the pressure for pressing the pressure belt against the scraper blade and thus narrowing the passage, while a narrowing effect can also be realized by providing the scraper blades with a flange.

The means for supplying the mixture to be separated at a controllable pressure to the nip between the pressure belt and the filter roller, and for removing the separated solid material from the surface of the filter roller while maintaining the pressure naturally occupy some space and increase the bulk of the apparatus.

Furthermore, upon the occurrence of breakdown during use of the filter press the material present in it must conventionally be removed. This may be quite a considerable amount of material, in view of the volume of the header and the vertical branch conduits connected to the header, which form part of the means for supplying the mixture to be separated at a controllable pressure to the nip between the pressure belt and the filter roller.

It is an object of the present invention to provide a filter press of the subject kind which is improved at least with regard to the above properties while maintaining, and preferably improving, its separating efficiency and capacity.

According to the present invention, there is provided a filter press which is characterized in that the filter rollers are grouped in two side-by-side rows of rollers located one below the other, the rollers in the two rows having an opposite direction of rotation, and both sides of the pressure belt being used for the exercise of pressure on the cylinder surfaces.

By virtue of the fact that, in accordance with the present invention, the filter rollers are disposed in two rows next to each other and in each row one below the other, it is possible, where the prior apparatus uses pairs consisting of a filter roller and a return roller, to use a filter roller as the return roller. Because of this, if through no other cause, an increase in capacity relative to the prior filter press can be effected with the same size of apparatus, and hence the same capacity with a smaller size of filter press apparatus.

Further aspects and advantages of the present invention will become apparent from the following description with reference to the accompanying drawings, which show a preferred embodiment of apparatus according to this invention.

In said drawings

FIG. 1 shows a front elevational view of the filter press, showing 6 filter rollers, i.e., 3 pairs of filter rollers;

FIG. 2 shows the apparatus in side-elevational view, taken on the line II—II of FIG. 1;

Figure 3:
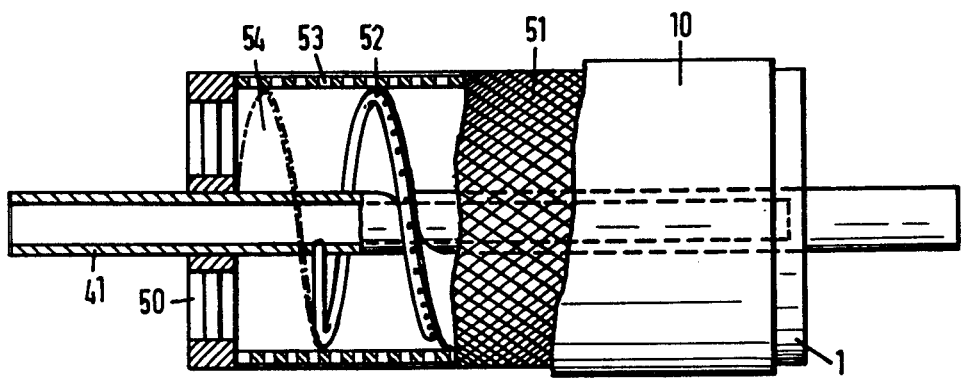
FIG. 3 shows a part-sectional view, with some parts being broken away, of a filter roller for use in apparatus according to the present invention.

Referring to the drawings, 27 designates the filter press according to the present invention, with frame 28 being the support for the various parts of the apparatus for separating the mixture, which comprises a liquid and a solid phase. These include horizontally disposed filter rollers 1, 2, 3, 4, 5, 6, with rollers 1, 2, 3 being grouped in a first vertical row, and rollers 4, 5, 6 in a second vertical row disposed next to the first row. Rollers 1, 2, 3, 4, 5, 6 are of the same diameter, and they are disposed in vertically offset relationship in the two rows. The rollers in the two rows are spaced equal distances from each other, and, as shown, preferably a distance less than the diameter of the rollers. 7 designates a tensioning roller, and 8 and 9 designate return rollers, while 10 represents an imperforate endless pressure belt, which is passed about the filter rollers and the return and tensioning rollers. 17 designates an electric motor, for driving via chains, such as chain 18, the rollers of the left row in the drawings. When the rollers of one row located opposite the interspaces of two rollers in the other row are disposed so that the planes through the longitudinal axis of the interspaces between the rollers and the axis of the corresponding opposite filter roller are horizontal planes, it is achieved that the area of contact between belt 10 and the cylindrical surface of rollers 1, 2, 3, 4, 5, 6 is considerably larger than corresponds to half the circumference of the filter rollers, so that the material to be separated and present between belt and roller can be subjected to pressure for a longer period of time, as a result of which more liquid can be expressed. For apparatuses with the same number of filter rollers and approximately the same dimensions of these filter rollers, the saving in volume that can be achieved with the apparatus according to the present invention may be as much as 80 to 85%, calculated on the prior apparatus with horizontally disposed filter rollers.

As shown in FIG. 1, the three superimposed filter rollers 1,2,3 can be driven and rotated with a single electric motor 17, with the other filter rollers 4, 5, 6 and the return and tensioning rollers 7, 8 and 9 being rotated through belt 10. Electric motor 17, as the only drive means, can be easily accommodated within frame 28 of the filter press apparatus, and consequently can be properly insulated to minimize noise.

The filter rollers are hollow cylindrical bodies with a perforated cylindrical surface 53 (FIG. 3). Preferably, a metal gauze 51 is applied around the roller with a mesh size at choice. By means of the metal gauze, the smooth cylinder surface of the filter roller becomes coarser, owing to which the mixture to be separated can be more easily carried along between the belt and the roller.

The filter roller is closed at one end, namely, on that side where the roller is driven, and open at the other end 50. Through this open end, the expressed liquid material passed through the perforations of the cylinder surface into the hollow roller can be discharged.

The hollow filter rollers of the filter press according to the invention comprise internally hollow cylindrical shafts 41-46, coaxial with the rollers, and about which (FIG. 3 for filter roller 1) a screw 54 is mounted having a diameter of such dimensions that the screw can serve to support and secure the perforated wall 53. Also, owing the rotation of the filter roller, the screw will provide accelerated transportation of the liquid phase to the open end 50 of the roller. Along portions of the edge of screw 54 and laterally thereof, a plurality of perforated conduits 52 are mounted in direct contact with the inner surface of the cylinder wall. One end of these conduits is closed and the other is connected to the hollow shaft 41, which itself can be connected to a liquid pump. Through this construction, the major amount of liquid phase can be discharged through shaft 41. The remaining quantity of liquid phase is then discharged by screw 54.

The advantage of using the conduits referred to, with a perforated zone virtually in direct contact with the inner surface of the perforated wall 53 resides in particular in the feature that the liquid expressed is pumped away virtually immediately, thereby preventing the separated liquid from being re-absorbed by the solid phase after the release of the pressure exercised on the separated solid phase. If desired, the filter rollers may be closed on both ends, so that all of the separated liquid phase must be discharged through conduits 52 and shaft 41.

Figure 4:
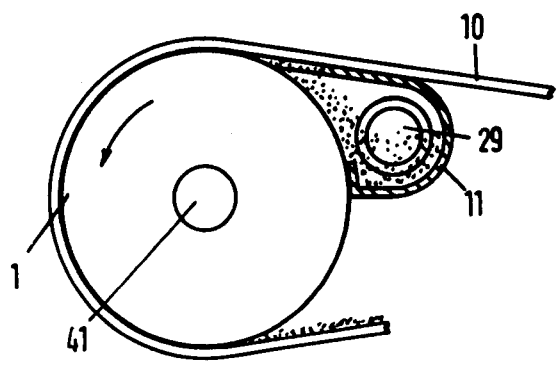
FIG. 4 shows a filter roller in cross-section, about which roller a pressure belt is passed and is further provided with a distributing means for the supply of mixture to be separated to the nip between the filter roller and the belt.

For supplying the mixture to be separated to the nip between filter wall and pressure belt, the apparatus according to the invention is provided with distributing means 11, 12, 13, 14, 15, 16 with a relatively small volume. Shown on a larger scale in FIG. 4, in the combination with filter roller 1, the distributing means 11-16 comprise a chamber connected on one end to supply conduits 29, 30, 31, 32, 33, 34, and at the other end to recycling conduits 35, 36, 37, 38, 39, 40. The distributing means may be made of a wear-resistant synthetic plastics material. The shape of the distributing means is adapted to the contours of the area in the vicinity of the nip between the pressure belt 10 and the filter roller, such that without appreciable loss of material the mixture to be separated can be maintained under the—controllable—pressure in the chamber. The pressure in the chamber can be produced via a pump to which supply conduits 29-34 are connected, and this pressure can be made controllable by incorporating a control valve in recyling conduits 35-40.

As will be readily apparent from FIG. 1, in the filter press according to the present invention both sides of pressure belt 10 are used for the exercise of pressure on the mixture to be separated which is present between belt 10 and the filter roller, and every other filter roller rotates in opposite direction of rotation. This circumstance, in combination with the longer residence time of the mixture to be separated between the belt 10 and the respective filter rollers 1-6, makes it possible to greatly simplify the discharge of the resulting solid phase as compared to the prior apparatus. The major quantity of the solid phase recovered at one filter roller will just fall off the belt at the position where the belt rounds the next filter roller, while any adherent residue of soid material can be removed from the belt with scraper members 19, 20, 21, 23, 24, 25, and all of the solid material is eventually collected and discharged via means 22 and 26, shown diagrammatically. Preferably, the two rows of filter rollers are mounted so as to be horizontally movable relatively to each other. For this purpose, for example, the left part of frame 28, as viewed in the drawings, may be made separate from, and horizontally displaceable relatively to, the fixed right-hand part, with the row comprising filter rollers 1,2,3 being connected to the loose frame section. By means of such a construction, the conditions under which filter rollers 1,2,3,4,5,6 are used, for example with regard to the pressure exercised by belt 10, can be more easily kept equal for all rollers than would be possible if the pressure could only be regulated by means of tensioning roller 7. A further feature which promotes a better control of equal operating conditions of the filter rollers in the apparatus according to the invention is that the rollers are not driven individually, as is the case in the prior apparatus referred to hereinbefore.

Summarizing, the following features can be mentioned as the major advantages of the filter press according to the present invention:

(a) a relatively small volume, in spite of the fact that all components effecting the separation can be mounted within the carrying frame;

(b) less noise owing to better possibilities of insulation on account of the fact that the components are mounted within the carrying frame;

(c) reduced consumption of energy, by virtue of the fact that we do not drive each roller;

(d) little wear and hence cheaper in maintenance and use;

(e) simpler supply and discharge systems;

(f) owing to limited size, machine parts are more readily accessible;

(g) owing to simpler construction, assembly and disassembly are simple;

(h) capacity higher than in prior apparatus with the same number and dimensions of the filter rollers;

(i) simple to combine with other machines;

(j) less product within the apparatus.

Naturally, modifications and alterations can be made without departing from the disclosure herein and in the accompanying drawings.

I claim:

1. A filter press for at least partially separating a mixture comprising a liquid phase and a solid phase into a product substantially containing the solid phase and a product substantially containing the liquid phase, comprising a plurality of parallel cylindrical hollow filter rollers each having a perforated cylindrical surface, a plurality of return rollers and/or tensioning rollers, and an endless imperforate pressure belt passed about a circumferential portion of the cylindrical surface of each of the filter rollers and about the return and tensioning rollers, for separation of the mixture in the area of contact of the pressure belt and the circumferential portion of the cylindrical surface of each of the filter rollers under an adjustable pressure exercised by the pressure belt on the cylindrical surface, distributing means for supplying the mixture to be separated at a controllable pressure to the nip between the pressure belt and each of the filter rollers, means for circulating the endless pressure belt with simultaneous rotation of the filter rollers and return rollers, means for supplying the mixture to be separated to the distributing means, means for discharging the separated liquid phase, and means for discharging the separated solid phase, means for mounting said filter rollers in two side-by-side rows of rollers with at least two rollers in each row, and the rollers in a row located one below the other, one surface of said pressure belt engaging a first roller in one row and the belt passing directly to a first roller in the next row and the opposite surface of the pressure belt engaging the said next roller contact by said pressure belt, and thereby causing rollers successively engaged by said pressure belt to rotate in opposite directions.

2. Apparatus according to claim 1, each said filter roller comprising a shaft, said filter roller mounting means comprising means for mounting the shafts of each of the two rows in a vertical plane, with the filter rollers in the two rows vertically offset relatively to each other, a filter roller of one row in opposition to the interspace between two rollers in the other row.

3. Apparatus according to claim 2, wherein the filter rollers are all of the same diameter, and the filter rollers in both rows are vertically spaced apart a distance less than the diameter of the rollers, and the planes containing the longitudinal axis of the interspaces between the rollers and the shaft of the corresponding opposite filter roller are horizontal planes.

4. Apparatus according to claim 1, and metal gauze on the perforated cylindrical surface of at least one of the filter rollers.

5. Apparatus according to claim 1, wherein one end of each of the filter rollers is open for the discharge of the filtrate, and the other end of the roller is closed and provided with means for driving the roller.

6. Apparatus according to claim 1, each said filter roller comprising a coaxial hollow cylindrical shaft, and a screw mounted thereabout and engaging and supporting the perforated cylindrical surface of said filter roller.

7. Apparatus according to claim 6, and a perforated conduit mounted along portions of the edge of the screw and laterally thereof, said conduit being fluid connected to the hollow shaft, a liquid pump, said shaft being fluid connected to said liquid pump.

8. Apparatus according to claim 7, wherein both ends of the filter roller are closed.

9. Apparatus according to claim 1, wherein said means for mounting the filter rollers in two rows comprises a carrying frame, said carrying frame comprising a fixed frame section supporting a first said row of filter rollers and a movable frame section horizontally displaceable relatively to said fixed frame section and supporting the other said row of filter rollers for movement therewith relative to the row of filter rollers connected to the fixed frame section.

* * * * *